Feb. 22, 1966                D. F. REYNOLDS                3,236,326
                   RESILIENT CANTILEVERED ENGINE SUPPORT
                           Filed Jan. 2, 1962
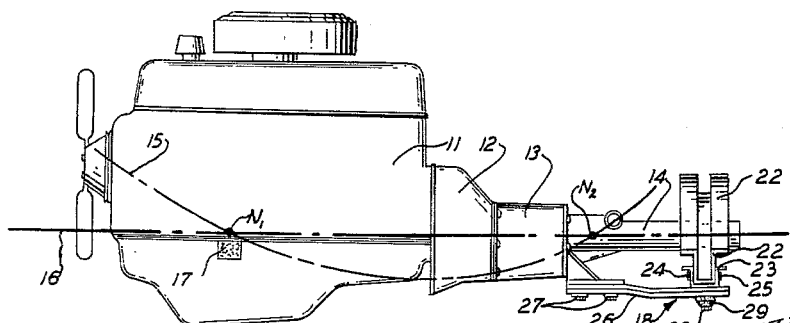
FIG. 1
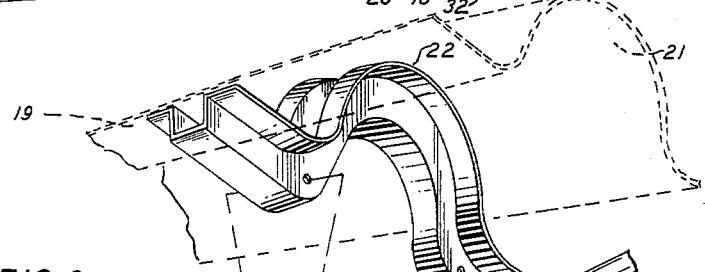
FIG. 2
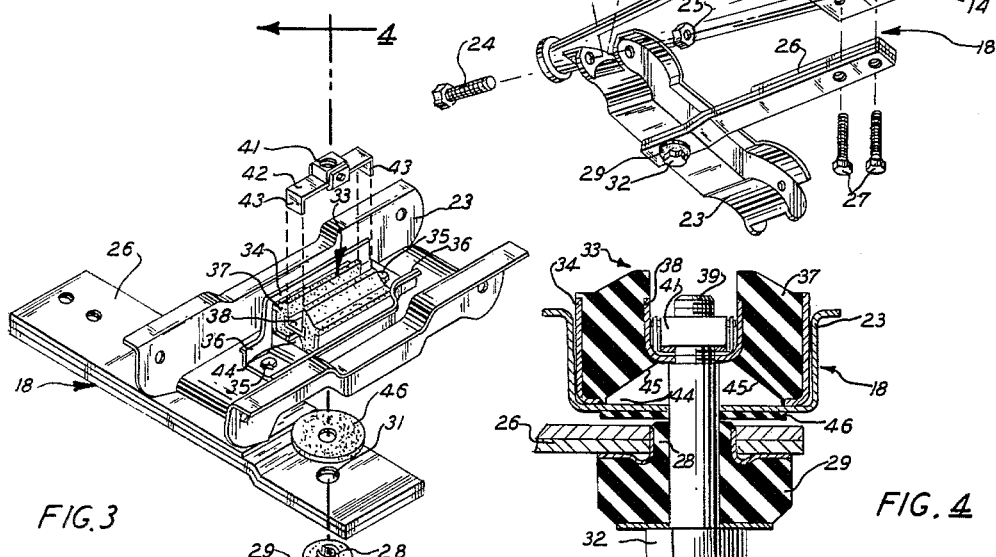
FIG. 3
FIG. 4
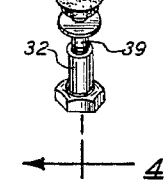
DONALD F. REYNOLDS
INVENTOR
BY John L. Faulkner
   Clifford L. Sadler
ATTORNEYS

United States Patent Office 3,236,326
Patented Feb. 22, 1966

3,236,326
RESILIENT CANTILEVERED ENGINE SUPPORT
Donald F. Reynolds, Ann Arbor, Mich., assignor to Ford Motor Company, Dearborn, Mich., a corporation of Delaware
Filed Jan. 2, 1962, Ser. No. 163,501
3 Claims. (Cl. 180—64)

This invention relates to motor vehicles and more particularly to a resilient support for the driving aggregate of a motor vehicle.

The vibratory movement of a reciprocating engine and the accompanying power train can transmit objectionable vibrations to a vehicle body and its passengers unless the engine is properly resiliently supported in the chassis. This problem is particularly acute in a unitized vehicle.

As is well known, a unitized vehicle inorporates no separate frame. Numerous, substantially rigid structural reinforcing members are secured to a thin cross sectional floor pan of the body to provide a rigid structure. It is common practice to secure at least one of the driving aggregate supports to one of the reinforcing members, which are known to those skilled in the art as "hard points." If the driving aggregate support does not isolate all of the vibrations from the body structure, the floor pan will act as a sounding board to amplify the engine vibrations. This creates objectionable noise in the passenger compartment of the vehicle.

The optimum points of support of the driving aggregate are at positions that coincide with or are positioned transversely of the longitudinal position of its vibratory nodal points. At these points the vibrations which must be absorbed by the resilient supports are minimal. In a unitized vehicle, however, it is frequently difficult to reconcile the special location of the structural hard points and the nodal points of the driving aggregate. In addition, the shapes of the elements of the driving aggregate frequently make it impossible to position all of the points of support directly at nodal points.

It is, therefore, the principal object of this invention to provide a resilient support for a motor vehicle driving aggregate that will isolate engine vibrations from the vehicle body structure and passengers.

More specifically, an object of this invention is to provide a resilient cantilevered support that permits the nodal point of a driving aggregate to be supported from a spaced hard point of a vehicle body structure.

A motor vehicle incorporating this invention has a driving aggregate including an engine and a body structure including at least one substantially rigid structural point. The novel driving aggregate support comprises an elongated resilient member secured at one of its ends to the rigid structural point of the body. The other end of the elongated resilient member is secured to the driving aggregate at a point substantially coincident with one of its nodal points to provide a cantilevered support for the driving aggregate.

Further objects and advantages of this invention will become more apparent as this description proceeds particularly when considered in conjunction with the accompanying drawings, wherein:

FIGURE 1 is a side elevational view schematically illustrating the driving aggregate of a motor vehicle embodying this invention.

FIGURE 2 is an exploded perspective view illustrating a portion of the underside of a motor vehicle incorporating this invention.

FIGURE 3 is an exploded top perspective view illustrating the resilient cantilever support.

FIGURE 4 is a cross sectional view taken along line 4—4 of FIGURE 3.

Referring now in detail to the drawings and in particular to FIGURE 1, there is shown a motor vehicle driving aggregate including an internal combustion engine 11, a clutch and clutch housing 12 and a transmission 13 having the tail shaft housing 14. During operation the driving aggregate is subjected to vibrations generated at least in part by the engine 11. The relative amplitude of the vibrations are indicated by the deviation of a line 15 with respect to a horizontal reference line 16. It will be noted that the vibration line 15 crosses the reference line 16 at two points $N_1$ and $N_2$. These points of minimum amplitude are called nodal points.

The most desirable points of support of the driving aggregate are at the nodal points or at positions that are transversely disposed from the longitudinal position of the nodal points $N_1$ and $N_2$. Front engine supports 17 are positioned on each side of the nodal point $N_1$. The supports 17 are resilient and connected to any suitable rigid, structural member of the vehicle structure in the known manner. A rear support indicated generally at 18 is connected to the transmission tail shaft housing 14 at a point contiguous to the rear nodal point $N_2$ in the manner to be described Referring now to FIGURE 2 the underside of a motor vehicle body incorporating a unitized construction is shown. The body structure includes a sheet metal floor pan 19 having a relatively thin cross section. The center of the floor pan 19 is provided with a raised tunnel portion 21 that provides a clearance for the rear portion of the driving aggregate and the drive shaft (not shown). Welded or otherwise secured to the floor pan 19 are a series of substantially rigid structural members only one of which, 22, is shown. The structural member 22 has a horseshoe-shaped portion that extends over the tail shaft housing 14 and across the tunnel portion 21 of the floor pan 19. The structural member 22 provides a body hard point for attachment of the rear support 18.

The rear support 18 includes a first member 23 that straddles the opening of the horseshoe-shaped portion of the structural member 22 and extends beneath the tail shaft housing 14. The member 23 is secured to the structural member 22 at each side by bolts 24 and nuts 25.

The forward end of a leaf spring assembly 26 consisting of three leaves is secured to the tail shaft housing 14 by bolts 27 at a point contiguous to the rear nodal point $N_2$. The rearwardmost end of the leaf spring assembly 26 is resiliently connected in a cantilever fashion to the member 23 in a manner which may be best understood by reference to FIGURES 3 and 4.

An axial projection 28 of a lower elastomeric insulator 29 passes through an aperture 31 formed in the rearwardmost end of the leaf spring assembly 26. Loads upon the leaf spring assembly 26 are thereby transferred directly to the lower elastomeric insulator 29. The lower insulator 29 is supported upon shoulder bolt 32 that passes through an aperture formed in the member 23. The shoulder bolt 32 connects the lower insulator 29 with an upper insulator assembly indicated generally at 33.

The upper insulator assembly 33 includes an outer sheet metal retaining member 34 which is secured to the member 23 by bolts 35 which pass through apertures in outturned ears 36 of the retainer member 34. A body of elastomeric material 37 is contained within the outer retaining member 34. An inner sheet metal retaining member 38 extends through a channel formed in the elastomeric body 37. A threaded end 39 of the shoulder bolt 32 is received in a nut 41 that is restrained by the nut retainer assembly 42. The nut retainer assembly 42 has downturned ears 43 that straddle the elastomeric body 37.

The outer sheet metal retainer member 34 of the upper insulator assembly 33 has an elongated aperture 44 formed therein. The elastomeric body 37 has bevelled lower surface 45 that is positioned directly above the aperture 44. Axial loads upon the shoulder bolt 32 will be transmitted through the nut retainer assembly 42 to the inner retainer 38 and the elastomeric body 37. The elastomeric body 37 will, because of the construction, be loaded primarily in shear.

As may be seen from FIGURE 4, the elastomeric body 37 is preloaded by the shoulder bolt 32 so that a clearance exists between the leaf spring assembly 26 and the member 23. This prevents vibrations from being transmitted directly from the leaf spring assembly 26 to the member 23. A resilient washer 46 prevents metal to metal contact between these members.

It should be readily apparent that any vibratory motion which may be exerted upon the forward end of the leaf spring assembly 26 by the driving aggregate through tail shaft housing 14 will be absorbed first by the leaf spring 26, secondly by the elastomeric insulator 29 and finally by the upper insulator assembly 33. In the event all of the vibrations cannot be absorbed, the rate of the leaf spring assembly 26 may be tuned to the rate of engine vibrations so that any vibrations which may be transmitted through the support 18 to the structural member 22 will be of sufficiently low frequency that they will not be objectionable to the passengers of the vehicle.

It is to be understood that the invention is not to be limited to the exact construction shown and described but that various changes and modifications may be made without departing from the spirit and scope of the invention, as defined by the appended claims.

What is claimed is:

1. In a motor vehicle, a driving aggregate including an engine, a unitized body structure including a relatively thin cross sectional floor pan having a raised tunnel portion to provide clearance for a portion of said drive aggregate, a substantially rigid horseshoe-shaped structural member secured to said tunnel portion at a position spaced from the vibratory nodal points of said driving aggregate, a driving aggregate support including a substantially rigid member secured to the open ends of said horseshoe-shaped structural member below said driving aggregate, a cantilevered leaf spring one end of which is operatively connected to said driving aggregate at a position contiguous to one of its vibratory nodal points, and resilient means connecting the other end of said leaf spring to said substantially rigid member.

2. In a motor vehicle, a driving aggregate including an engine, a unitized body structure including a relatively thin cross sectional floor pan having a raised tunnel portion to provide clearance for a portion of said drive aggregate, a substantially rigid horseshoe-shaped structural member secured to said tunnel portion at a position spaced from the vibratory nodal points of said driving aggregate, a driving aggregate support including a substantially rigid member secured to the open ends of said horseshoe-shaped structural member below said driving aggregate, a cantilevered leaf spring one end of which is operatively connected to said driving aggregate at a position contiguous to one of its nodal points, and resilient means connecting the other end of said leaf spring to said substantially rigid member, said resilient means including first elastomeric means operatively connected to said leaf spring, second elastomeric means operatively connected to said substantially rigid member, and means operatively connecting said elastomeric means, the rate of said leaf spring being tuned to reduce the frequency of vibrations transmitted to said floor pan.

3. In a motor vehicle, a driving aggregate including an engine, a unitized body structure including a relatively thin cross sectional floor pan reinforced by at least one substantially rigid structural member, a driving aggregate support comprising first elastomeric means supported by said substantially rigid structural member, second elastomeric means supported by said first elastomeric means, a cantilevered leaf spring supported at one end by said second elastomeric means, and means operatively connecting the other end of said leaf spring to said driving aggregate at one of its vibratory nodal points, the rate of said leaf spring being tuned to reduce the frequency of vibrations transmitted to said floor pan.

References Cited by the Examiner

UNITED STATES PATENTS

| | | | |
|---|---|---|---|
| 1,890,871 | 12/1932 | Trott | 180—64 |
| 2,017,628 | 10/1935 | Lancia | 248—7 |
| 2,055,279 | 9/1936 | D'Aubarede | 180—64 X |
| 2,081,213 | 5/1937 | Anibal | 180—64 X |
| 2,083,277 | 6/1937 | Scott | 248—18 X |
| 2,111,563 | 3/1938 | Kliesrath | 180—64 |
| 2,117,919 | 5/1938 | Summers | 248—18 |
| 2,144,848 | 1/1939 | Miller | 248—10 X |
| 2,864,573 | 12/1958 | Olley et al. | 248—9 |
| 3,005,608 | 10/1961 | Andrews et al. | 248—8 |

BENJAMIN HERSH, *Primary Examiner.*

PHILIP ARNOLD, A. HARRY LEVY, *Examiners.*